US011106065B2

(12) United States Patent
Park et al.

(10) Patent No.: US 11,106,065 B2
(45) Date of Patent: Aug. 31, 2021

(54) DISPLAY DEVICE

(71) Applicant: SAMSUNG DISPLAY CO., LTD., Yongin-si (KR)

(72) Inventors: Dongjin Park, Hwaseong-si (KR); Jingyu Sim, Suwon-si (KR); Junggil Oh, Hwaseong-si (KR); Kwangsun You, Cheonan-si (KR); Won-Chul Lee, Seoul (KR); Byoungjin Jin, Yongin-si (KR); Jonghyeon Choi, Pyeongtaek-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 113 days.

(21) Appl. No.: 16/242,201

(22) Filed: Jan. 8, 2019

(65) Prior Publication Data

US 2019/0227369 A1  Jul. 25, 2019

(30) Foreign Application Priority Data

Jan. 19, 2018  (KR) .......................... 10-2018-0007369

(51) Int. Cl.
*G02F 1/1335* (2006.01)
*G02F 1/1333* (2006.01)
*F21V 8/00* (2006.01)
*G02F 1/1362* (2006.01)

(52) U.S. Cl.
CPC ..... *G02F 1/133308* (2013.01); *G02B 6/0055* (2013.01); *G02B 6/0073* (2013.01); *G02F 1/133305* (2013.01); *G02F 1/136286* (2013.01); *G02F 1/13332* (2021.01); *G02F 1/133314* (2021.01)

(58) Field of Classification Search
CPC .............. G02F 2001/133314; G02F 1/133608
See application file for complete search history.

(56) References Cited

U.S. PATENT DOCUMENTS

| 9,338,905 | B2 | 5/2016 | Ahn et al. | |
|---|---|---|---|---|
| 9,640,145 | B2 | 5/2017 | Cho | |
| 9,805,671 | B2 | 10/2017 | Kim et al. | |
| 2001/0035931 | A1* | 11/2001 | Kumagai | .......... G02F 1/133308 349/153 |
| 2006/0193120 | A1* | 8/2006 | Huang | .................. G02F 1/1336 362/33 |
| 2007/0184716 | A1* | 8/2007 | Jung | ................. G02F 1/133308 439/595 |

(Continued)

FOREIGN PATENT DOCUMENTS

| KR | 10-2014-0060078 | 5/2014 |
|---|---|---|
| KR | 10-1519987 | 5/2015 |

(Continued)

*Primary Examiner* — Andrew J Coughlin
(74) *Attorney, Agent, or Firm* — F. Chau & Associates, LLC

(57) ABSTRACT

A display device includes a backlight unit and a display panel. The backlight unit includes a bottom chassis that includes a fixing surface curved to have a shape that corresponds to a graph of a sine function, a light guide member that includes a light exit surface curved to have a shape that corresponds to the fixing surface, and a light source that provides light to the light guide member. The display panel includes a display surface curved to have a shape that corresponds to the light exit surface.

19 Claims, 13 Drawing Sheets

(56) References Cited

U.S. PATENT DOCUMENTS

| | | | | |
|---|---|---|---|---|
| 2010/0246111 | A1* | 9/2010 | Yokota | H05K 5/02 |
| | | | | 361/679.01 |
| 2011/0080695 | A1* | 4/2011 | Cho | G02F 1/133308 |
| | | | | 361/679.01 |
| 2013/0321740 | A1* | 12/2013 | An | H05K 5/02 |
| | | | | 349/58 |
| 2014/0118994 | A1* | 5/2014 | Paek | F21V 33/0052 |
| | | | | 362/97.2 |
| 2014/0133073 | A1* | 5/2014 | Ahn | G02F 1/133308 |
| | | | | 361/679.01 |
| 2015/0253599 | A1* | 9/2015 | Park | G02F 1/133308 |
| | | | | 349/61 |
| 2017/0139249 | A1 | 5/2017 | Moon et al. | |
| 2017/0146850 | A1 | 5/2017 | Lee et al. | |

FOREIGN PATENT DOCUMENTS

| | | |
|---|---|---|
| KR | 10-1536301 | 7/2015 |
| KR | 10-1658629 | 9/2016 |

* cited by examiner

DISPLAY DEVICE

CROSS-REFERENCE TO RELATED APPLICATION

This U.S. non-provisional patent application claims priority under 35 U.S.C. § 119 from, and the benefit of, Korean Patent Application No. 10-2018-0007369, filed on Jan. 19, 2018 in the Korean Intellectual Property Office, the contents of which are herein incorporated by reference in their entirety.

BACKGROUND

1. Technical Field

Embodiments of the present disclosure relates to a display device. More particularly, embodiments of the present disclosure are directed to a curved display device.

2. Discussion of the Related Art

Flat-surface type display devices have been used with various information processing devices, such as television sets, monitors, notebook computers, mobile phones, etc., to display an image. In recent years, a curved display device having a curved display surface has been developed. A curved display device provides an image with an improved three-dimensional effect, sense of immersion, and presence.

A curved display device includes a curved display panel and a backlight unit. A backlight unit can be classified as an edge-illumination type backlight unit or a direct-illumination type backlight unit, depending on a position of the light source with respect to the display surface through which the image is displayed.

In a curved display device, stress is concentrated on a certain portion of the display panel. In this case, when the display panel displays a black image, a defect can occur in which some portions of the image are displayed white.

SUMMARY

Embodiments of the present disclosure can provide a display device that can prevent a display panel from separating from a backlight unit.

Embodiments of the present disclosure can provide a display device that can prevent stress from concentrating on certain portions between the display panel and the backlight unit.

Embodiments of the inventive concept provide a display device that includes a display panel that includes a curved display surface with a continuously changing curvature and a backlight unit that includes a light source that emits light and a bottom chassis that supports the display panel and maintains the curvature of the display panel.

The bottom chassis includes a plurality of first main beading parts that extend in a first direction and are spaced apart in a second direction that crosses the first direction, a second main beading part connected to first ends of the first main beading parts and that is in the second direction, a third main beading part connected to second ends of the first main beading parts and that extends in the second direction, a first sub-beading part connected to a center portion of each of the first main beading parts and that extends in the second direction, a second sub-beading part interposed between the first sub-beading part and the second main beading part, connected to a first portion of each of the first train beading parts, and that extends in the second direction, and a third sub beading part interposed between the first sub-heading part and the third main beading part, connected to a second portion of each of the first main beading parts, and that extends in the second direction.

The display surface has a shape that corresponds to a graph of a sine function.

The curvature of a first portion of the display surface decreases with increasing distance in the first direction from a center portion of the display panel.

The curvature of a second portion of the display surface increases with increasing distance in the first direction from a center portion of the display panel.

A distance in the first direction between the second sub-beading part and the first sub-beading part is shorter than a distance in the first direction between the second sub-beading part and the second main beading part.

A distance in the first direction between the second sub-beading part and the first sub-beading part is equal to a distance in the first direction between the second sub-beading part and the second main beading part.

Each of the first main beading parts, the second main beading part, and the third main beading part protrudes from a base part of the bottom chassis by a first length, and each of the first sub-beading part, the second sub-beading part, and the third sub-beading part protrudes from the base part of the bottom chassis by a second length that differs from the first length. The first length is longer than the second length.

The first sub-beading part is disposed corresponding to a center portion of the display panel, and each of the second sub-beading part and the third sub-beading part is disposed corresponding to a portion to which an applied stress is equal to or greater than about 0.6 times of and is equal to or less than about 0.8 times of a stress applied to the center portion of the display panel.

The display device further includes a light guide member that receives light from the light source and that is disposed between the display panel and bottom chassis, and a reflection member disposed between the light guide member and the bottom chassis that reflects light incident to reflection member back to the light guide member.

Embodiments of the inventive concept provide a display device that includes a backlight unit and a display panel. The backlight unit includes a bottom chassis that includes a fixing surface curved to have a shape that corresponds to a graph of a sine function, a light guide member that includes a light exit surface curved to have a shape that corresponds to the fixing surface, and a light source that provides light to the light guide member. The display panel includes a display surface curved to have a shape that corresponds to the light exit surface.

The bottom chassis includes a base part, main beading parts that protrude from the base part by a first length, and sub-beading parts that protrude from the base part by a second length that differs from the first length, and each of the sub-beading parts is disposed between the main beading parts.

Each of the main beading parts includes a groove formed therein and that has a predetermined depth.

A first distance in the first direction between the second sub-beading part and the first sub-beading part is shorter than a second distance in the first direction between the second sub-beading part and a corner of the base part that is nearest to the second sub-beading part. The first distance is about 0.65 times to about 0.8 times of the second distance.

The first sub-beading part is disposed corresponding to a center portion of the display panel, and each of the second sub-beading part and the third sub-beading part is disposed corresponding to a portion to which an applied stress is equal to or greater than about 0.6 times of and is equal to or smaller than about 0.8 times of a stress applied to the center portion of the display panel.

The second sub-beading part and the third sub-beading, part are symmetrically disposed with respect to the first sub-beading part.

According to the above, stress applied to certain portions of the display panel of a curved display device is reduced. Accordingly, a backlight unit and the display panel can be prevented from separating from each other. Thus, the display quality of the display device can be improved.

DETAILED DESCRIPTION

Figure 1:
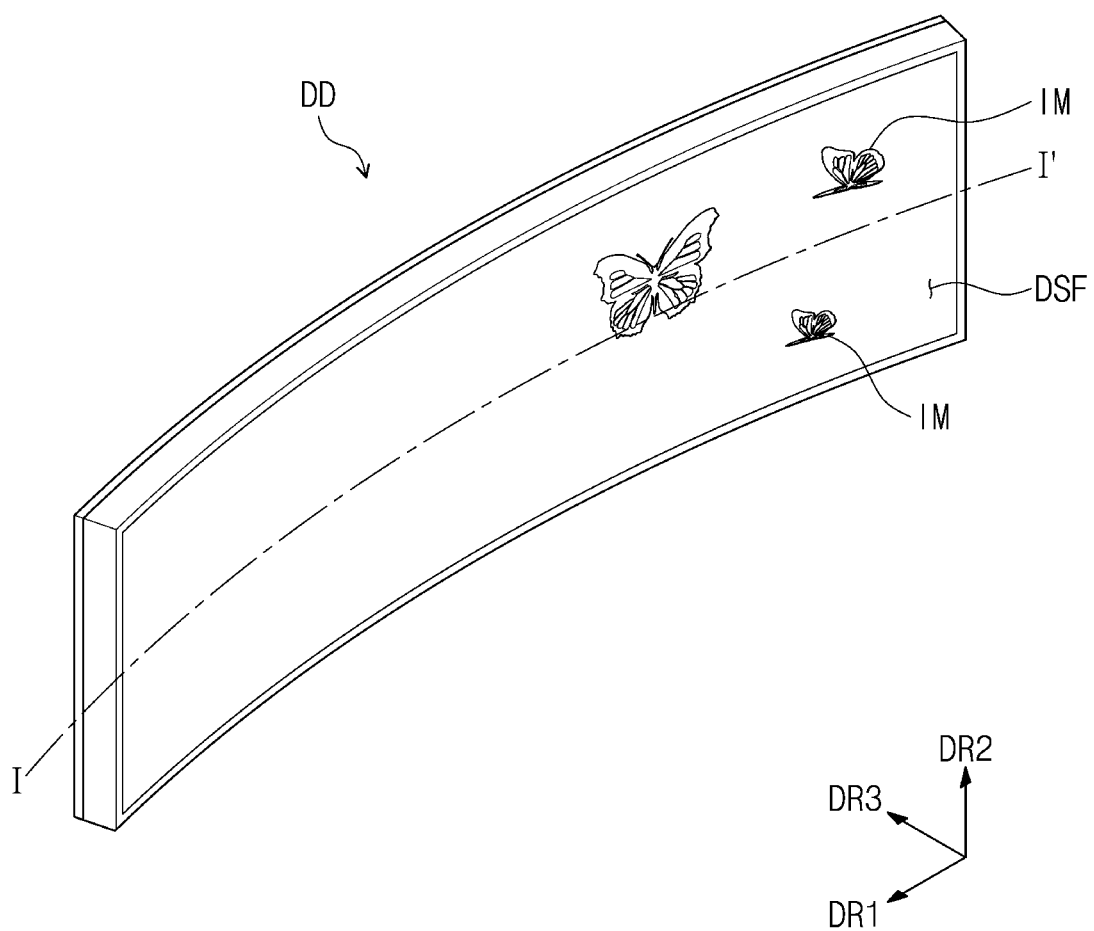
FIG. 1 is a perspective view of a display device according to an exemplary embodiment of the present disclosure.

Hereinafter, exemplary embodiments of the present disclosure will be described in detail with reference to the accompanying drawings.

In the drawings, the thickness of layers, films, and regions may be exaggerated for clarity.

Figure 2:
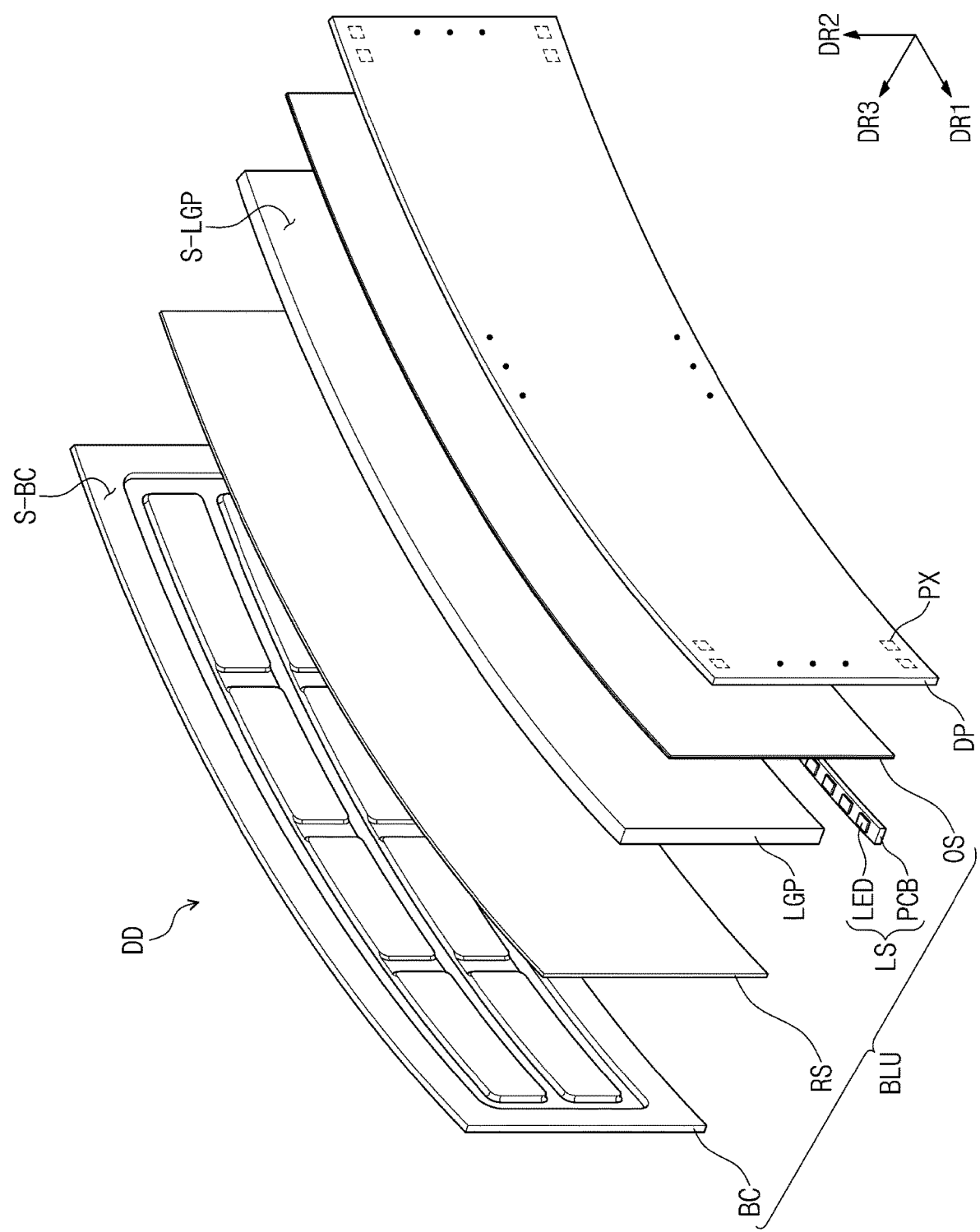
FIG. 2 is an exploded perspective view of a display device shown in FIG. 1.
Figure 3:
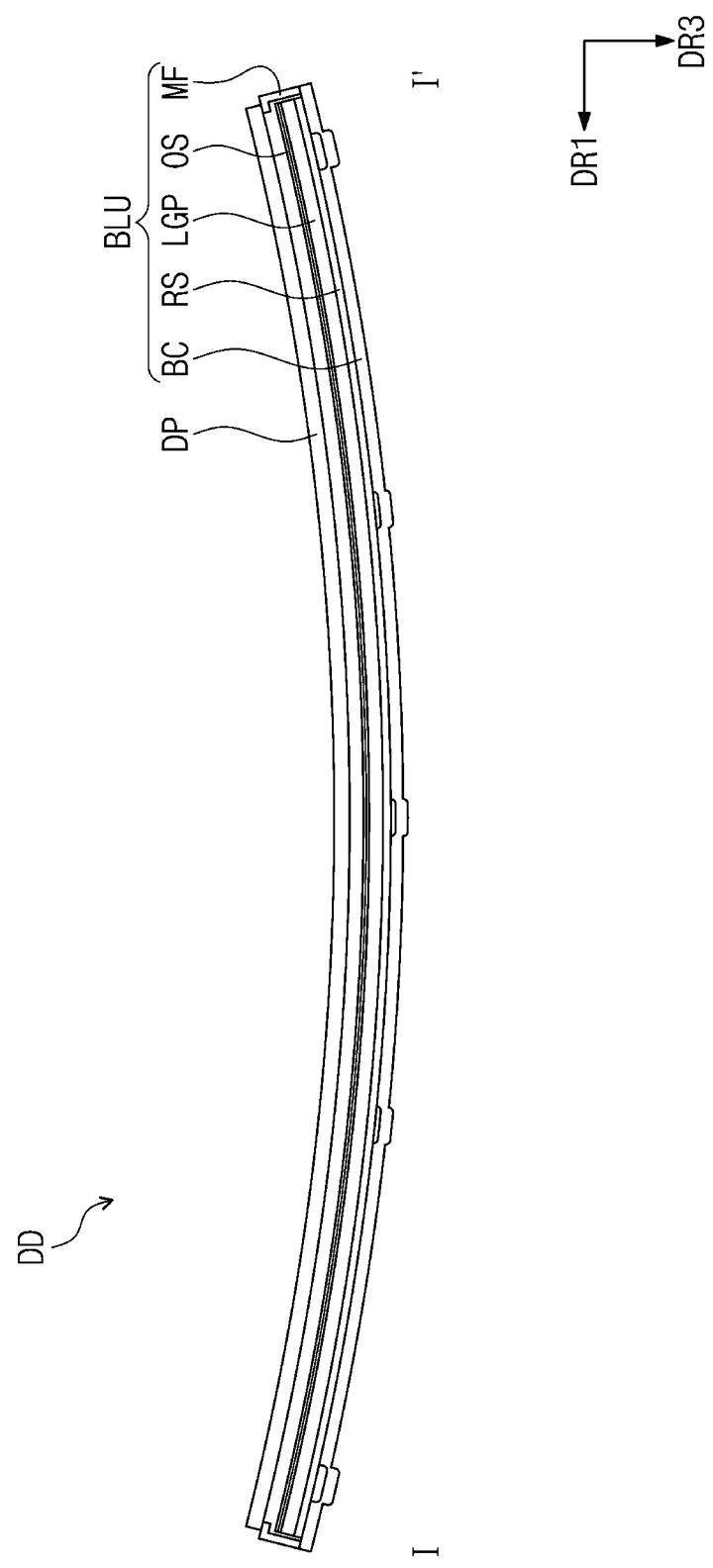
FIG. 3 is a cross-sectional view taken along line I-I' of FIG. 1.

FIG. 1 is a perspective view of a display device DD according to an exemplary embodiment of the present disclosure. FIG. 2 is an exploded perspective view of a display device DD shown in FIG. 1. FIG. 3 is a cross-sectional view taken along line I-I' of FIG. 1.

Referring to FIGS. 1 to 3, according to an exemplary embodiment, the display device DD includes a display panel DP and a backlight unit BLU.

As show in FIG. 1, according to an exemplary embodiment, the display device DD includes a curved display surface DSF. The display surface DSF is curved in a third direction DR3. The display surface DSF has a continuously changing curvature instead of a constant curvature. For example, the display surface DSF may have a shape corresponding to a trigonometric function, such as a sine function. In detail, a cross-section of the display surface DSP in the plane of a first direction D1 and the third direction DR3 has a shape corresponding to the graph of the trigonometric function.

The display surface DSF is provided on the display panel DP.

According to an exemplary embodiment, the display surface, which is flat before being bent, is defined by the first direction DR1 and a second direction DR2, and a thickness direction of the display panel DP corresponds to the third direction DR3. In FIG. 1, the first direction DR1 corresponds to a horizontal direction, and the second direction DR2 corresponds to a vertical direction.

Referring to FIGS. 1 to 3, according to an exemplary embodiment, the display panel DP displays an image IM. FIG. 1 shows a butterfly as an example of the image IM. A display area of the display panel DP includes a plurality of pixels PX arranged therein. The display panel DP is not particularly limited, and the display panel DP may include any non self-emissive type display panel that requires a separate light source, such as a reflective/transmissive or transmissive type display panel.

According to an exemplary embodiment, the backlight unit BLU includes a light guide member LGP, a light source LS, a reflection member RS, a bottom chassis BC, a mold frame MF, and an optical member OS.

According to an exemplary embodiment, the light guide member LGP is curved in the third direction DR3. The light guide member LGP includes a light exit surface S-LGP carved in a shape that corresponds to the display surface DSF.

According to an exemplary embodiment, the light guide member LGP guides light emitted by the light source LS and transmits the light to the display panel DP through the light exit surface S-LGP. The light guide member LGP is transparent.

According to an exemplary embodiment, the light source LS includes a printed circuit board PCB and a plurality of light emitting diode packages LED mounted on the printed circuit board. PCB. Each of the light emitting diode packages LED includes a light emitting diode that emits light and a lens that covers the light emitting diode.

According to an exemplary embodiment, the light source LS emits light to one side portion of the light guide member LGP.

According to an exemplary embodiment, the optical member OS is curved in the third direction DR3. The optical member OS is curved in a shape that corresponds to the display surface DSF.

According to an exemplary embodiment, the optical member OS is interposed between the display panel DP and the light guide member LGP in the third direction DR3. The optical member OS improves characteristics of the light received from the light guide member LGP and transmits the light to the display panel DP.

According to an exemplary embodiment, the optical member OS includes a plurality of thin film sheets.

According to an exemplary embodiment, the reflection member RS is disposed on one surface of the light guide member LGP. The reflection member RS reflects light received from the light source LS through the light guide member.

According to a exemplary embodiment, the reflection member RS includes a plurality of thin film sheets.

In a present exemplary embodiment, the reflection member RS makes contact with one surface of the light guide member LGP and the bottom chassis BC. The reflection member RS is curved in the third direction DR3. The reflection member RS is curved in a shape that corresponds to the optical member OS.

According to an exemplary embodiment, the bottom chassis BC includes a fixing surface S-BC curved in the third direction DR3.

According to an exemplary embodiment, the bottom chassis BC supports the display panel DP using the mold frame MF and determines a degree of curvature of the display panel DR. That is, a curvature degree of the light exit surface S-LGP of the light guide member LGP and a curvature degree of the display surface DSF of the display panel DP are determined by the bottom chassis BC.

In a present exemplary embodiment, the bottom chassis BC include a metal. Accordingly, the bottom chassis BC can be processed by a sheet metal forming operation.

The bottom chassis BC will be described in detail below with reference to FIGS. 6A to 7D.

According to an exemplary embodiment, the mold frame MF is fixed to a portion of the bottom chassis BC.

According to an exemplary embodiment, the mold frame MF holds the display panel DP curved in the third direction DIU. The mold frame MF maintains the display panel DP, which would otherwise return to a flat state, in a curved state. That is, the curvature degree of the display device DD is maintained by the mold frame MF, but embodiments are not limited thereto. That is, a carved display panel DP can be formed by using curved substrates formed of a rigid material.

According to exemplary embodiments of the present disclosure, the mold frame MF can be omitted. In this case, the display panel DP and the backlight unit Mil are attached to each other by an adhesive.

According to an exemplary embodiment, the display device DD farther includes a bottom cover that covers the display panel DP, the backlight unit BLU and the driving circuits that drive the display panel DP.

Figure 4:
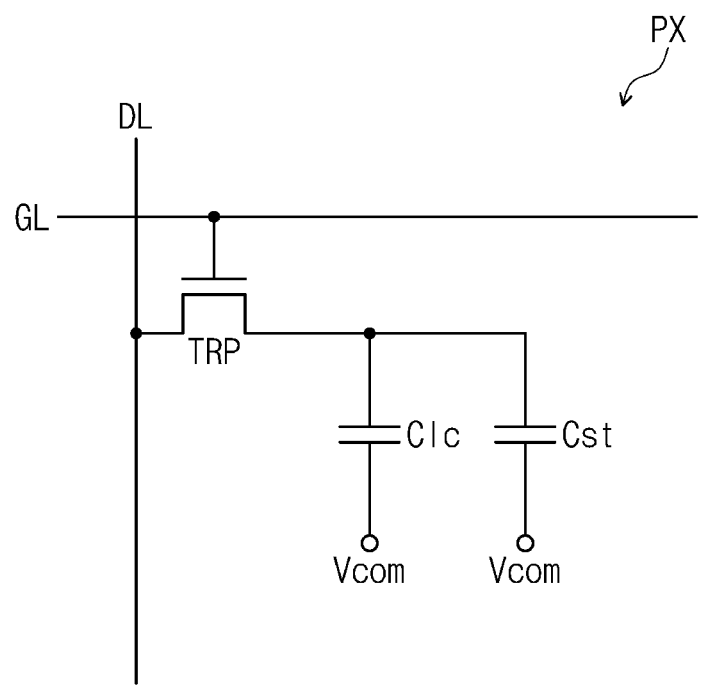
FIG. 4 is an equivalent circuit diagram of a pixel according to an exemplary embodiment of the present disclosure.
Figure 5:
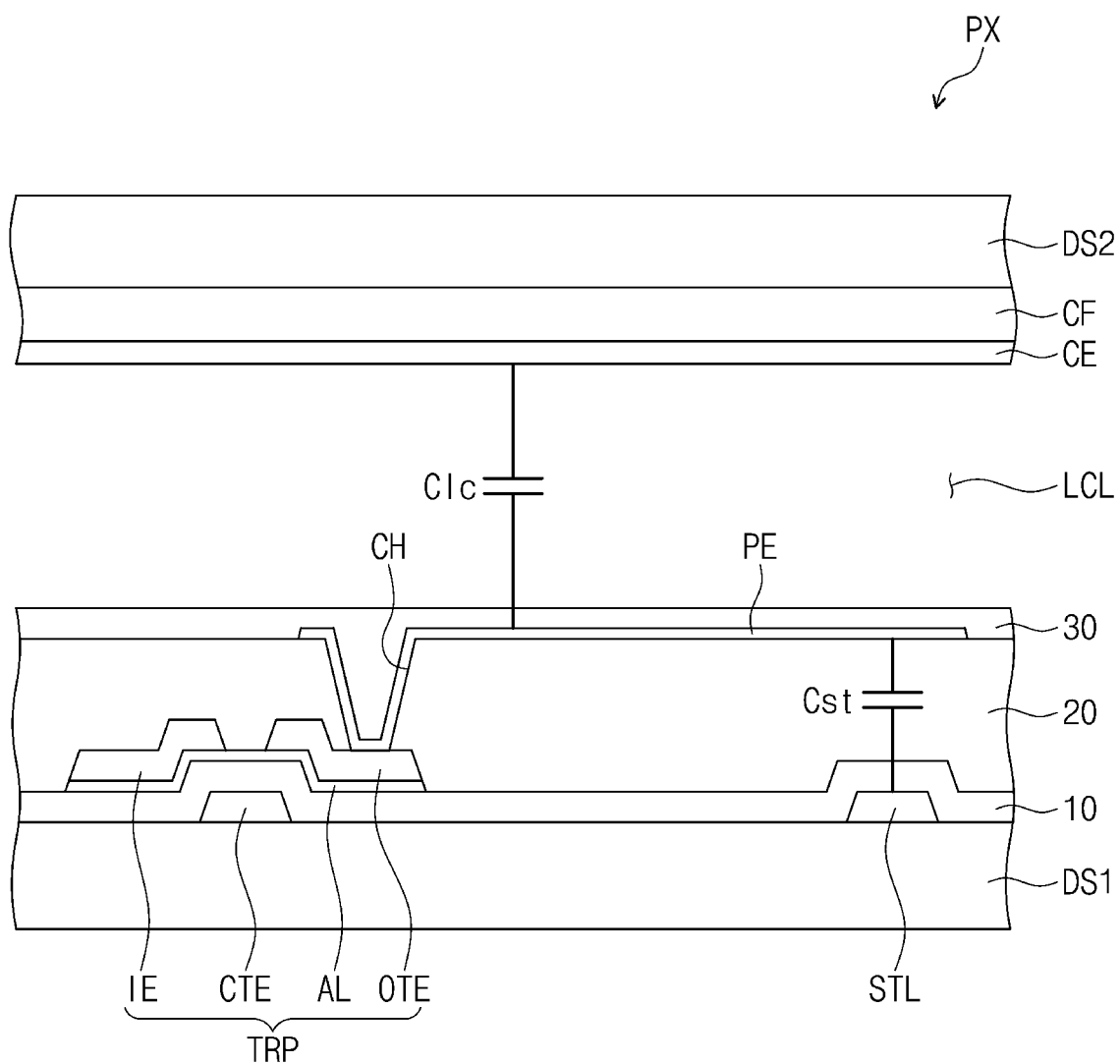
FIG. 5 is a cross-sectional view of a pixel according to an exemplary embodiment of the present disclosure.

FIG. 4 is an equivalent circuit diagram of the pixel PX according to an exemplary embodiment of the present disclosure, and FIG. 5 is a cross-sectional view of the pixel PX according to an exemplary embodiment of the present disclosure.

Referring to FIG. 4, the pixel PX includes a pixel thin film transistor TRP, hereinafter referred to as a "pixel transistor", a liquid crystal capacitor Clc, and a storage capacitor Cst.

Hereinafter, the term "transistor" in the present description means a "thin film transistor". In a present exemplary embodiment, the storage capacitor Cst can be omitted.

According to an exemplary embodiment, FIGS. 4 and 5 show the pixel transistor TRP electrically connected to a gate line GL and a data line DL as a representative example.

According to an exemplary embodiment, the pixel transistor TRP outputs a pixel voltage that corresponds to a data signal received through the data line DL in response to a gate signal received through the gate line GL.

According to an exemplary embodiment, the liquid crystal capacitor Clc is charged with the pixel voltage output from the pixel transistor TRP. An alignment of liquid crystal directors included in a liquid crystal layer LCL, shown in FIG. 5, changes depending on the amount of electric charge charged in the liquid crystal capacitor Clc. The liquid crystal layer transmits or blocks light incident thereto according to the alignment of the liquid crystal directors.

According to an exemplary embodiment, storage capacitor Cst is connected in parallel with the liquid crystal capacitor Clc. The storage capacitor Cst maintains the alignment of the liquid crystal directors for a certain period.

Referring to FIG. 5, according to an exemplary embodiment, the pixel transistor TRP includes a control electrode CTE connected to the gate line GL, an active layer AL that overlaps the control electrode CTE, an input electrode IE connected to the data line DL, and an output electrode OTE spaced apart from the input electrode IE.

According to an exemplary embodiment, the liquid crystal capacitor Clc includes a pixel electrode PE and a common electrode CE. The storage capacitor Cst includes the pixel electrode PE and a portion of a storage line STL that overlaps the pixel electrode PE. A common voltage Vcom is transmitted to the common electrode CE, and the data signal is transmitted to the pixel electrode PE.

According to an exemplary embodiment, the gate line GL and the storage line STL are disposed on one surface of a first substrate DS1. The control electrode CTE branches from the gate line GL. The gate line GL and the storage line STL include a metal, such as aluminum (Al), silver (Ag), copper (Cu), molybdenum (Mo), chromium (Cr), tantalum (Ta), titanium (Ti), or an alloy thereof. The gate line GL and the storage line STL have a multi-layer structure that includes a titanium layer and a copper layer.

According to an exemplary embodiment, a first insulating layer 10 is disposed on the one surface of the first substrate DS1 and covers the control electrode CTE and the storage lute STL. The first insulating layer 10 includes at least one of an inorganic material and an organic material. The first insulating layer 10 has a multi-layer structure that includes a silicon nitride layer and a silicon oxide layer.

According to an exemplary embodiment, the active layer AL is disposed on the first insulating layer 10 and overlaps the control electrode CTE. The active layer AL includes a semiconductor layer and an ohmic contact layer.

According to an exemplary embodiment, the active layer AL includes amorphous silicon or polysilicon. In addition, the active layer AL includes a metal oxide semiconductor.

According to an exemplary embodiment, the output electrode OTE and the input electrode IE are disposed on the active layer AL. The output electrode OTE and the input electrode IE are spaced apart from each other, Each of the output electrode OTE and the input electrode IE partially overlaps the control electrode CTE.

According to an exemplary embodiment, the pixel transistor TRP shown in FIG. 5 has a staggered structure, but a structure of the pixel transistor TRP is not limited thereto. The pixel transistor TRP may have a planar structure.

According to an exemplary embodiment, a second insulating layer 20 is disposed above the first insulating layer 10 and covers the active layer AL, the output electrode OTE, and the input electrode IE. The second insulating layer 20 provides a flat surface. The second insulating layer 20 includes an organic material.

According to an exemplary embodiment, the pixel electrode FE is disposed on the second insulating layer 20. The pixel electrode PE is connected to the output electrode OTE through a contact hole CH that penetrates the second insulating layer 20. An alignment layer 30 is disposed on the pixel electrode PE and the second insulating layer 20 that covers the pixel electrode PE.

According to an exemplary embodiment, a color filter layer CE is disposed on one surface of a second substrate DS2. The common electrode CE is disposed on one surface of the color fitter layer CF. The common voltage is transmitted to the common electrode CE. The common voltage has a value that differs from the pixel voltage. An alignment layer is disposed on one surface of the common electrode CE that covers the common electrode CE. Another insulating layer may be interposed between the color filter layer CF and the common electrode CE.

According to an exemplary embodiment, the pixel electrode PE and the common electrode CE form the liquid crystal capacitor Clc with the liquid crystal layer LCL interposed between the pixel electrode FE and the common electrode CE. In addition, the pixel electrode PE and the portion of the storage line STL that face each other form the storage capacitor Cst, where the first insulating layer 10 and the second insulating layer 20 are interposed between the pixel electrode PE and the portion of the storage line STL. The storage line STL receives a storage voltage that has a magnitude that differs from the pixel voltage. The storage voltage may have the same magnitude as the common voltage.

It should be understood that the cross-section of the pixel PX shown in FIG. 5 is a non-limiting example. Different from FIG. 5, at least one of the color filter layer CF or the common electrode CE may be disposed on the first substrate DS1. According to other embodiments of the present disclosure, the display panel may include a vertical alignment (VA) mode pixel, a patterned vertical alignment (PVA) mode pixel, an in-plane switching (IPS) mode pixel, a fringe-field switching (FFS) mode pixel, or a plane-to-line switching (PLS) mode pixel.

Figure 6A:
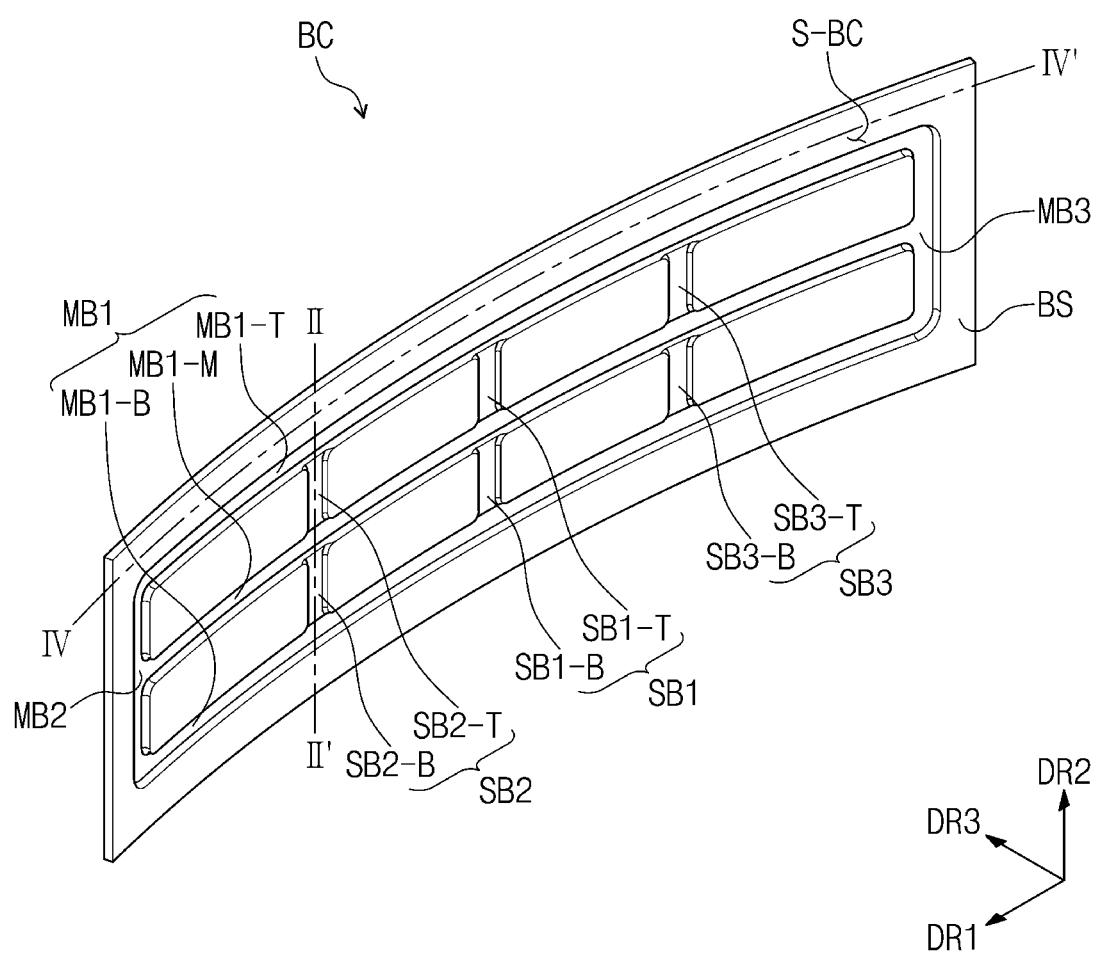
FIG. 6A is a perspective view of a front portion of a bottom chassis according to an exemplary embodiment of the present disclosure.
Figure 6B:
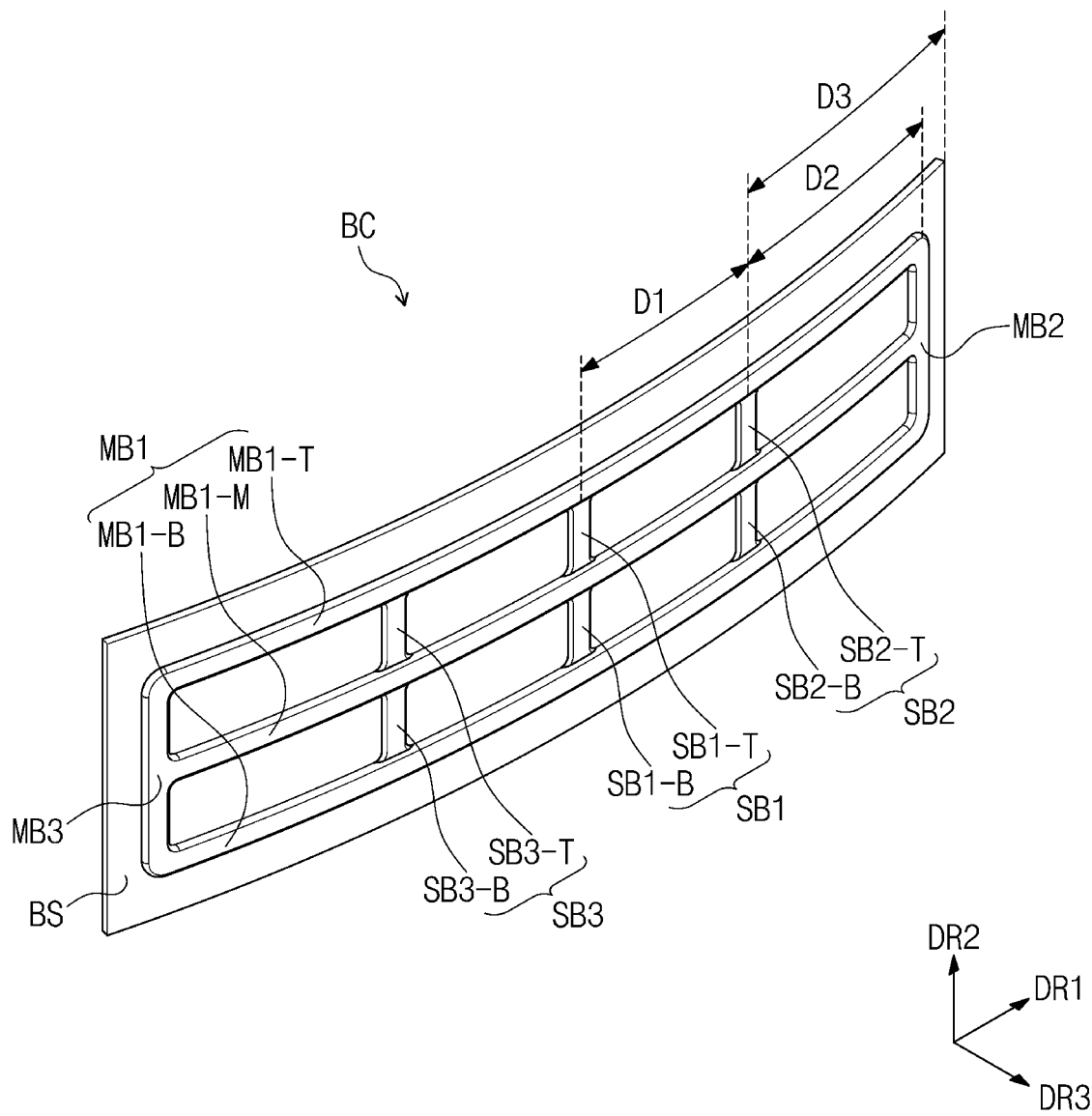
FIG. 6B is a perspective view of a rear portion of a bottom chassis shown in FIG. 6A.
Figure 6C:
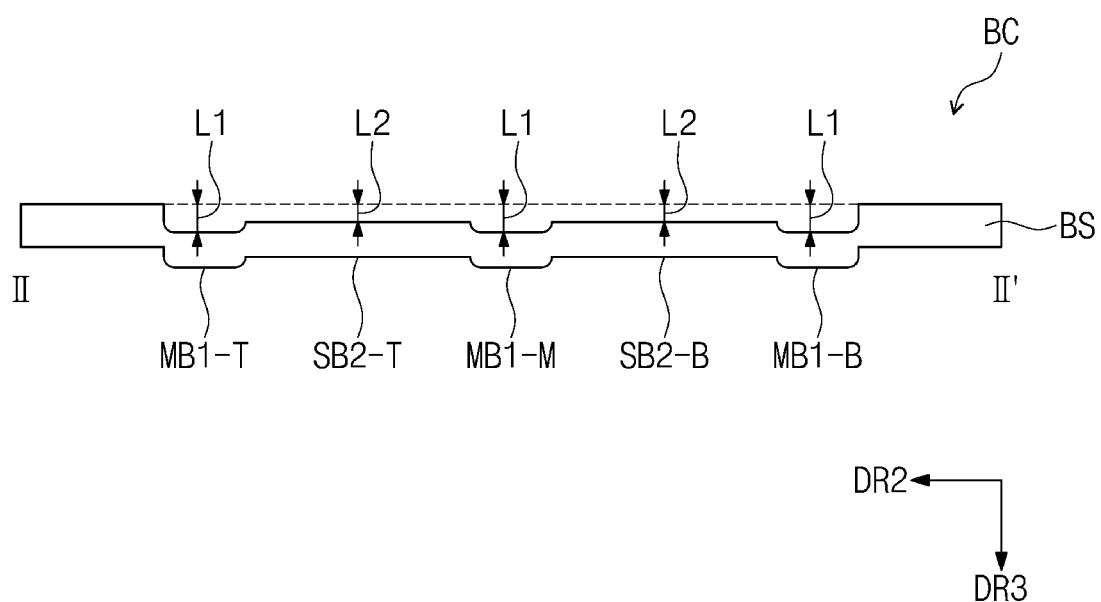
FIG. 6C is a cross-sectional view taken along line II-II' shown in FIG. 6A.

FIG. 6A is a perspective view of a front portion of the bottom chassis BC according to an exemplary embodiment of the present disclosure. FIG. 6B is a perspective view of a rear portion of the bottom chassis BC shown in FIG. 6A. FIG. 6C is a cross-sectional view taken along line shown in FIG. 6A.

According to an exemplary embodiment, the bottom chassis BC includes a base part BS, main beading parts MB1, MB2, and MB3, and sub-beading parts SB1, SB2, and SB3.

According to an exemplary embodiment, the main beading parts MB1, MB2, and MB3 and the sub-beading parts SB1, SB2, and SB3 protrude in the third direction DR3 from the base part BS. The main beading parts MB1, MB2, and MB3 and the sub-beading parts SB1, SB2, and SB3 are formed by a beading method that is a sheet metal forming method.

According to an exemplary embodiment, the main beading parts MB1, MB2, and MB3 and the sub-beading parts SB1, SB2, and SB3 maintain the rigidity of die bottom chassis BC such that the bottom chassis BC maintains its curvature in the third direction DR3.

According to an exemplary embodiment, the main beading parts MB1, MB2, and MB3 include a plurality of first main beading parts MB1, a second main beading part MB2, and a third main beading part MB3.

According to an exemplary embodiment, the first main beading parts MB1 extend in the first direction DR1 and are spaced apart in the second direction DR2.

According to an exemplary embodiment, FIGS. 6A and 6B show a top first main beading part MB1-T disposed at a relatively upper portion when viewed in the second direction DR2, a bottom first main beading part MB1-B disposed at a relatively lower portion when viewed in the second direction DR2, and a middle first main beading part MB1-M disposed at an intermediate portion between the top first main beading part MB1-T and the bottom first main beading part MB1-B, when viewed in the second direction DR2. However, the number of the first main beading parts MB1 is not limited thereto.

According to an exemplary embodiment, the second main beading part MB2 is connected to first ends of the first main beading parts MB1. The second main beading part MB2 extends in the second direction DR2.

According to an exemplary embodiment, the third main beading part MB3 is connected to the second ends of the first main beading parts MB1 that are opposite from the first ends. The third main beading part MB3 extends in the second direction DR2.

According to an exemplary embodiment, the sub-beading parts SB1, SB2, and SB3 include a first sub-beading part SB1, a second sub-beading part SB2, and a third sub-beading part SB3. Each of the sub-beading parts SB1, SB2, and SB3 extends in the second direction DR2.

In a present exemplary embodiment, the first sub-beading part SB1 is divided into a first upper part SB1-T and a first lower part SB1-B by the middle first main beading part MB1-M. The first sub-beading part SB1 is connected to a center portion of each of the first main beading parts MB1.

In a present exemplary embodiment, the second sub-beading part SB2 is divided into a second upper part SB2-T and a second lower part SB2-B by the middle first main beading part MB1-M. The second sub-beading part SB2 is disposed between the first sub-beading part SB1 and the second main beading part MB2 and is connected to a portion of each of the first main beading parts MB1.

In a present exemplary embodiment, the third sub-beading part SB3 is divided into a third upper part SB3-T and a third lower part SB3-B by the middle first main beading part MB1-M. The third sub-beading part SB3 is disposed between the first sub-beading part SB1 and the third main beading part MB3 and connected to the other portion of each of the first main beading parts MB1.

Referring to FIG. 6B, according to an exemplary embodiment, a distance between the first sub-beading part SB1 and the second sub-beading part SB2 measured in the extension direction of the base part BS will be referred to as a "first distance D1". A distance between the second sub-beading part SB2 and the second main beading part MB2 measured in the extension direction of the base part BS will be referred to as a "second distance D2". A distance between the second sub-beading part SB2 and a corner of the base part BS nearest to the second main beading part MB2 measured in the extension direction of the base part BS will be referred to as a "third distance D3".

In a present exemplary embodiment, the first distance D1 is shorter than the second distance D2. For example, the first distance D1 is about 0.8 to about 0.95 times of the second distance D2, but is not limited thereto. That is, the first distance D1 can be equal to the second distance D2.

Since the third distance D3 is greater than the second distance D2, the first distance D1 is shorter than the third distance D3. For example, the first distance D1 is about 0.65 to about 0.8 times of the third distance D3.

In a present exemplary embodiment, a ratio between the first distance D1, the second distance D2, and the third distance D3 is determined by the stress applied to the display panel DP which is caused by the display panel DP being curved in the third direction DR3.

For example, referring to FIG. 2, a center portion of the bottom chassis BC of the display panel DP is subject to the greatest amount of stress. Accordingly, according to an exemplary embodiment, the first sub-beading part SB1 is disposed at the center portion of the bottom chassis BC to withstand the stress applied to the center portion of the bottom chassis BC.

According to an exemplary embodiment, the second sub-heading part SB2 is disposed tip at a position where the stress is equal to or greater than about 0.6 times and less than or equal to about 0.8 times of the stress applied to the center portion of the bottom chassis BC. In this case, the first distance D1 between the first sub-beading part SB1 and the second beading part SB2 is about 0.8 times to about 0.95 times of the second distance D2 or about 0.65 times to about 0.8 times of the third distance D3.

According to an exemplary embodiment, when the second sub-beading part SB2 is disposed at a position other than where the stress is equal to or greater than about 0.6 times and less than or equal to about 0.8 times the stress applied to the center portion of the bottom chassis BC, the shape of the bottom chassis BC may not be maintained, since the second sub-beading part SB2 is disposed at a portion subject to a stress that is too large or too small.

According to an exemplary embodiment, the third sub-beading part SB3 is disposed symmetrically to the second sub-beading part SB2 with respect to the first sub-beading part SB1.

Referring to FIG. 6C, according to an exemplary embodiment, the top, middle and bottom first main beading parts MB1-T, MB1-M, and MB1-B protrude from the base part BS by a first length L1, and the second upper and lower sub-beading parts SB2-T and SB2-B protrude from the base part BS by a second length L2. The second length L2 is shorter than the first length L1.

According to an exemplary embodiment, the second main beading part MB2 and the third main beading part MB3 protrude from the base part BS by the first length L1, similar to the top, middle and bottom first main beading parts MB1-T, MB1-M, and MB1-B. In addition, the first upper and lower sub-beading parts SB1-T and SB1-B, and the third upper and lower sub-beading parts SB3-T and SB3-B protrude from the base part BS by the second length L2, similar to the second upper and lower sub-beading parts SB2-T and SB2-B.

According to an exemplary embodiment, the main beading parts MB1, MB2, and MB3 and the sub-beading parts SB1, SB2, and SB3 are formed by a processing method that is called the beading method which applies a pressure to a flat metal plate. When the pressure applied to form the sub-beading parts SB1, SB2, and SB3 is less than the pressure applied to form the main beading parts MB1, MB2, and MB3, the process can be more easily performed.

Figure 7A:
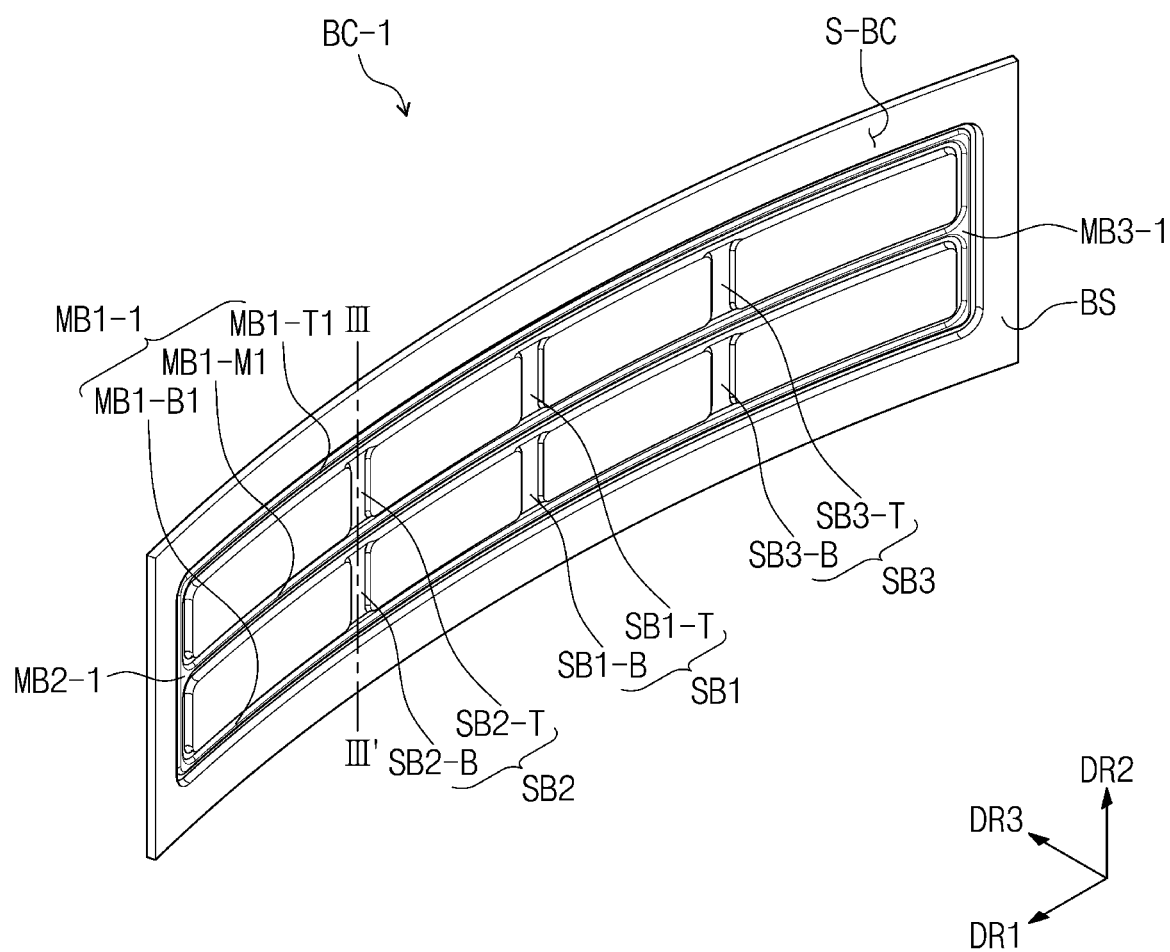
FIG. 7A is a perspective view of a front portion of a bottom chassis according to an exemplary embodiment of the present disclosure.
Figure 7B:
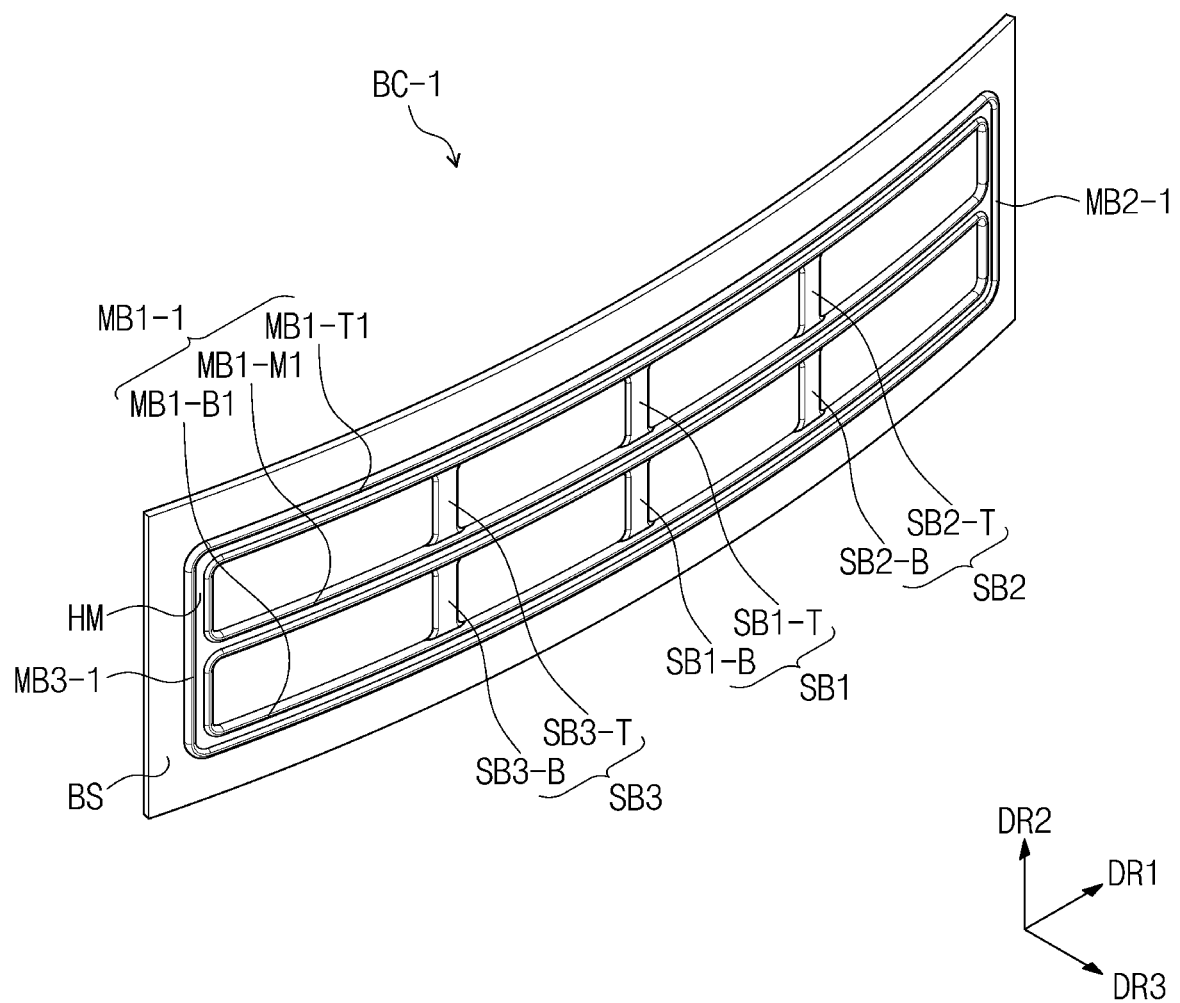
FIG. 7B is a perspective view of a rear portion of a bottom chassis shown in FIG. 7A.
Figure 7C:
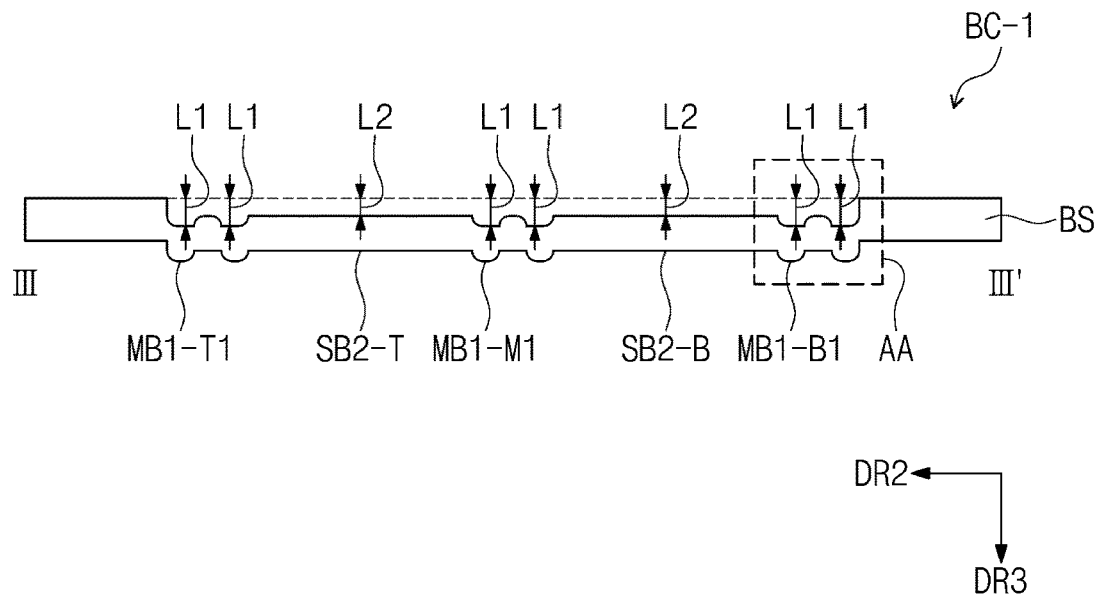
FIG. 7C is a cross-sectional view taken along line III-III' shown in FIG. 6A.
Figure 7D:
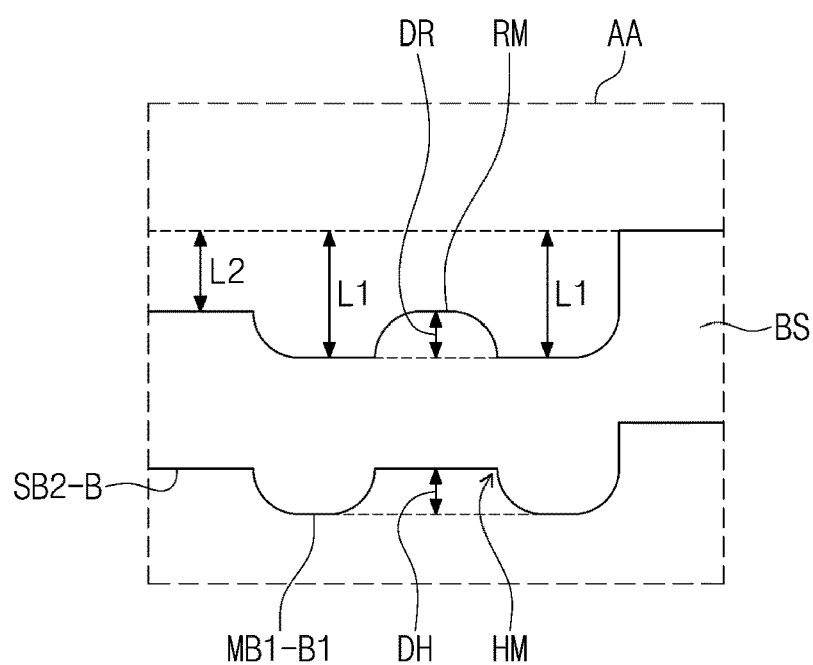
FIG. 7D is an enlarged view showing portion "AA" of FIG. 7C.

FIG. 7A is a perspective view of a from portion of a bottom chassis BC-1 according to an exemplary embodiment of the present disclosure. FIG. 7B is a perspective view of a rear portion of the bottom chassis BC-1 shown in FIG. 7A. FIG. 7C is a cross-sectional view taken along line III-III' shown in FIG. 7A. FIG. 7D is an enlarged view showing portion "AA" of FIG. 7C.

According to an exemplary embodiment, the bottom chassis BC-1 includes a base part BS, main beading parts MB1-1, MB2-1, and MB3-1, and sub-beading parts SB1, SB2, and SB3.

According to an exemplary embodiment, the main beading parts MB1-1, MB2-1, and MB3-1 include a plurality of first main beading parts MB1-1, a second main beading part MB2-1, and a third main beading part MB3-1.

According to an exemplary embodiment, the first main beading parts MB1-1 extend in the first direction DR1 and are spaced apart in the second direction DR2.

According to an exemplary embodiment, FIGS. 7A and 7B show a top first main beading part MB1-T1 disposed at a relatively upper portion when viewed in the second direction DR2, a bottom first main beading part MB1-B1 disposed at a relatively lower portion when viewed in the second direction DR2, and a middle first main beading part MB1-M1 disposed at an intermediate portion between the first main beading part MB1-T1 and the first main beading part MB1-B1, when viewed in the second direction DR2. However, the number of the first main beading parts MB1-1 is not limited thereto.

According to an exemplary embodiment, each of the main beading parts MB1-1, MB2-1, and MB3-1 includes a groove HM formed therein.

According to an exemplary embodiment, the main beading parts MB1-1, MB2-1, and MB3-1 and the sub-beading parts SB1, SB2, and SB3 protrude from the base part BS in the third direction DR3.

Referring to FIGS. 7C and 7D, according to an exemplary embodiment, the top, middle and bottom first main beading parts MB1-T1, MB1-M1 and MB1-B1 protrude from the base part BS by a first length L1, and second upper and lower sub-beading parts SB2-T and SB2-B protrude from the base part BS by a second length L2.

According to an exemplary, embodiment, each of the top, middle and bottom first main beading parts MB1-T1, MB1-M1, and MB1-B1 includes a groove HM formed therein that has a predetermined depth DH.

According to an exemplary embodiment, the second main beading part MB2-1 and the third main beading part MB3-1 each include a groove HM that has a predetermined depth DH, similar to the top, middle and bottom first main beading parts MB1-T1, MB1-M1, and MB1-B1.

In addition, as shown in FIG. 7D, according to an exemplary embodiment, each of the top, middle and bottom first main beading parts MB1-T1, MB1-M1, and MB1-B1 includes a ridge RM formed on a surface opposite from the groove HM. The ridge has a predetermined height DR=DH.

According to an exemplary embodiment, the main beading parts MB1-1, MB2-1, and MB3-1 protrude in the third direction DR3 with a more dynamic shape due to the groove HM and ridge RM. Accordingly, characteristics of the bottom chassis BC, which withstands externally applied stress, are improved.

Figure 8A:
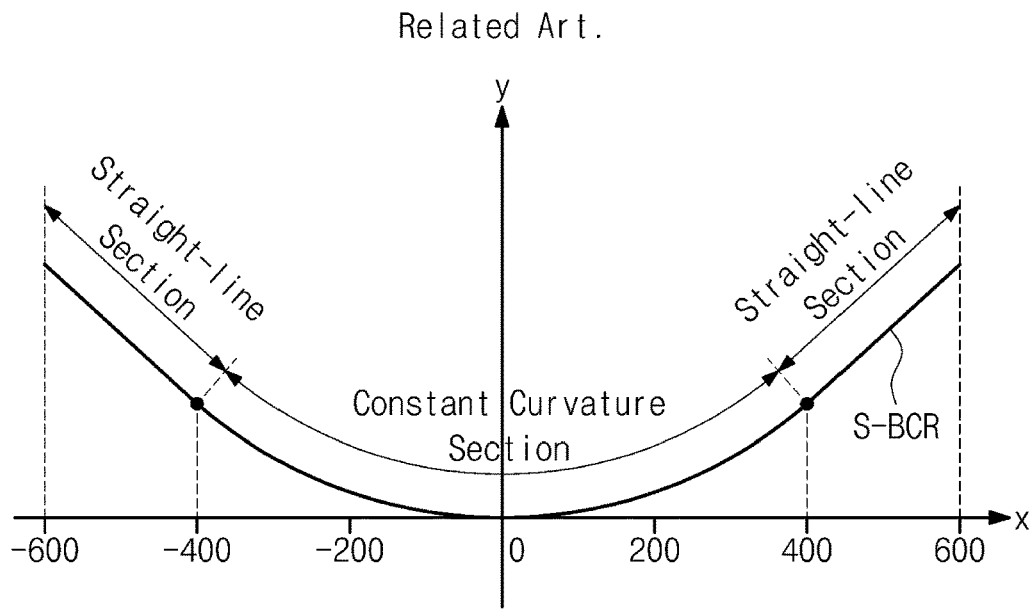
FIG. 8A shows a fixing surface of a bottom chassis of a backlight unit included in a conventional display device.
Figure 8B:
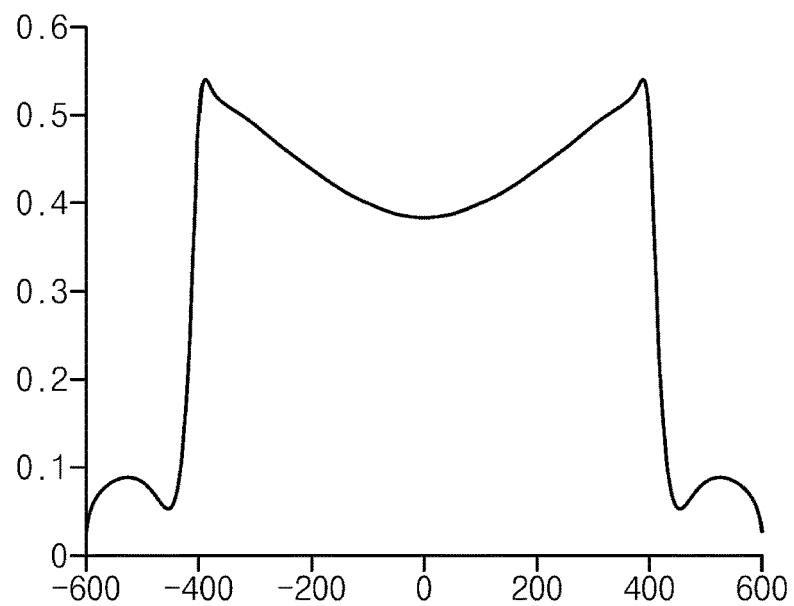
FIG. 8B is a graph of stress applied to a fixing surface shown in FIG. 8B.

FIG. 8A shows a fixing surface S-BCR of a bottom chassis of a backlight unit included in a conventional display device. FIG. 8B is a graph of stress applied to the fixing surface S-BCR shown in FIG. 8A as a function of distance from a center of the fixing surface S-BCR.

The fixing surface S-BCR of a bottom chassis of a backlight unit included in a conventional display device includes a curvature section having a constant curvature and straight-line sections that extend without being curved.

In FIGS. 8A and 8B, a conventional display device having a horizontal length of about 1200 mm will be described, and the constant curvature section meets the straight-line sections at a distance away from a center of the fixing surface S-BCR by about 400 mm. Referring to FIG. 8B, the fixing surface S-BCR receives the most stress from a display panel of a conventional display device at the point where the constant curvature section meets the straight-line sections. In a conventional display device, a defect can occur in which the display panel separates from the backlight unit due to the stress.

Figure 9A:
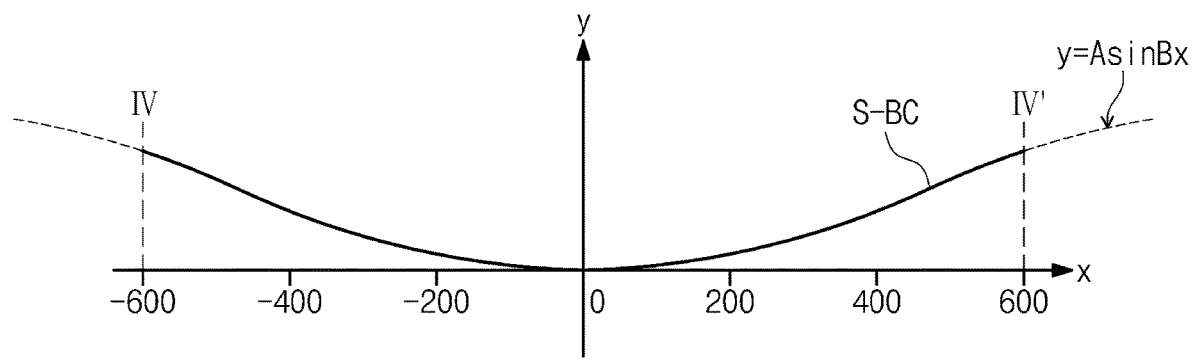
FIG. 9A shows a fixing surface of a bottom chassis of a backlight unit included in a display device according to an exemplary embodiment of the present disclosure.
Figure 9B:
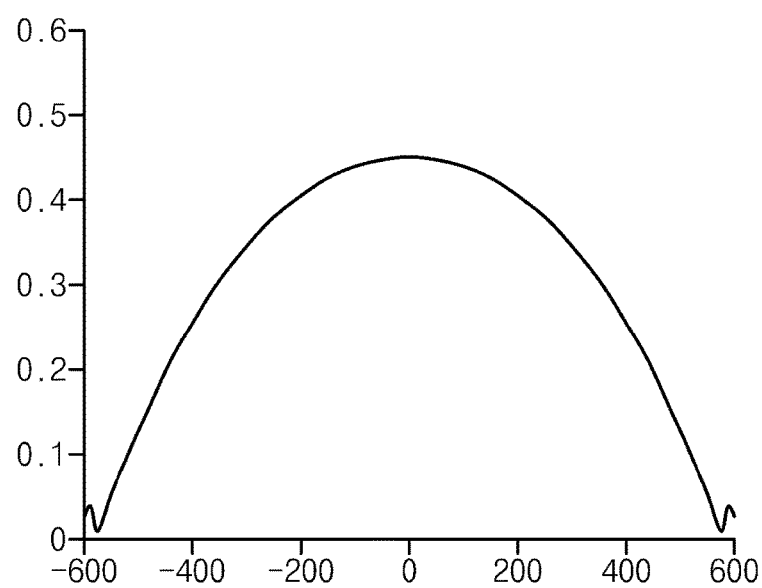
FIG. 9B is a graph of stress applied to a fixing surface shown in FIG. 9B.

FIG. 9A shows a fixing surface S-BC of a bottom chassis BC of a backlight unit included in a display device DD according to an exemplary embodiment of the present disclosure. FIG. 9B is a graph of stress applied to a fixing surface S-BC shown in FIG. 9A as a function of distance from a center of the fixing surface S-BC.

In FIGS. 9A and 9B, according to an exemplary embodiment, similar to the conventional display device shown in FIGS. 8A and 8B, a display device having a horizontal length of about 1200 mm will be described.

According to an exemplary embodiment, FIG. 9A shows a shape of the fixing surface S-BC taken along a line IV-IV' of FIG. 6A.

Referring to FIG. 9A, according to an exemplary embodiment, the fixing surface S-BC has a shape corresponding to a graph of a sine function. The sine function may be, for example, y=A sin Bx. In this case, each of the values of "A" and "B" may be freely chosen by a designer who designs the display device DD.

The fixing surface S-BC according to an exemplary embodiment shown in FIG. 9A has a relatively large curvature at a center portion thereof when compared with the fixing surface S-BCR of FIG. 8A, and thus the stress applied to the center portion of the fixing surface S-BC is greater than the stress applied to the center portion, of the fixing surface S-BCR. However, the stress applied to the fixing surface S-BC of FIG. 9A gradually decreases with increasing distance from the center portion, unlike the stress applied to the fixing surface S-BCR of FIG. 8A. Accordingly, stress is not concentrated at certain portions of the fixing surface S-BC, and thus the defect in which the display panel DP separates from the backlight unit BLU can be prevented.

Referring to FIG. 2, according to an exemplary embodiment, since the fixing surface S-BC has a shape that corresponds to the graph of a sine function, the light exit surface S-LGP and the display surface DSF also have shapes that corresponds to the graph of a sine function.

Since a fixing surface S-BC according to an exemplary embodiment has a shape that corresponds to the graph of a sine function, the curvature of some portions of the fixing surface S-BC gradually decreases with increasing distance from the center portion of the fixing surface S-BC, and the curvature of other portions of the fixing surface S-BC gradually increases with increasing distance from the center portion of the fixing surface S-BC. In a present exemplary embodiment, the portions of the fixing surface S-BC with increasing curvature are nearer to the center portion of the fixing surface S-BC than the portions of the fixing surface S-BC with decreasing curvature.

In this case, according to an exemplary embodiment, the light exit surface S-LGP and the display surface DSF have a curvature that corresponds to that of the fixing surface S-BC.

Although exemplary embodiments of the present disclosure have been described, it is understood that embodiments of the present disclosure should not be limited to these exemplary embodiments but various changes and modifications can be made by one ordinary skilled in the art within the spirit and scope of the present disclosure as hereinafter claimed. Therefore, the disclosed subject natter should not be limited to any single embodiment described herein, and the scope of embodiments of the present inventive concept shall be determined according to the attached claims.

What is claimed is:

1. A display device, comprising:
a display panel that includes a curved display surface; and
a bottom chassis that supports the display panel and has a shape that corresponds to the curved display surface,
wherein the bottom chassis comprises:
a plurality of first main beading portions that extend in a first direction and are spaced apart in a second direction that crosses the first direction;
a second main beading portion that extends between first ends of the first main beading portions and that extends in the second direction;
a third main beading portion that extends between second ends of the first main beading portions and that extends in the second direction;
a first sub-beading portion that crosses a center portion of each of the first main beading portions and that extends in the second direction;
a second sub-beading portion that is between the first sub-beading portion and the second main beading portion, that crosses a portion of each of the first main beading portions, and that extends in the second direction; and
a third sub-beading portion that is between the first sub-beading portion and the third main beading portion, that crosses another portion of each of the first main beading portions, and that extends in the second direction.

2. The display device of claim 1, wherein the display surface has a shape that corresponds to a graph of a sine function.

3. The display device of claim 1, wherein a curvature of a first portion of the display surface decreases with increasing distance in the first direction from a center portion of the display panel.

4. The display device of claim 3, wherein a curvature of a second portion of the display surface increases with increasing distance in the first direction from the center portion of the display panel.

5. The display device of claim 1, wherein a distance in the first direction between the second sub-beading portion and the first sub-beading portion is shorter than a distance in the first direction between the second sub-beading portion and the second main beading portion.

6. The display device of claim 1, wherein a distance in the first direction between the second sub-beading portion and the first sub-beading portion is equal to a distance in the first direction between the second sub-beading portion and the second main beading portion.

7. The display device of claim 1, wherein
each of the first main beading portions, the second main beading portion, and the third main beading portion protrudes from a base portion of the bottom chassis by a first length, and
each of the first sub-beading portion, the second sub-beading portion, and the third sub-beading portion protrudes from the base part of the bottom chassis by a second length that differs from the first length.

8. The display device of claim 7, wherein the first length is longer than the second length.

9. The display device of claim 1, wherein
the first sub-beading portion is disposed corresponding to a center portion of the display panel, and
each of the second sub-beading portion and the third sub-beading portion is disposed corresponding to a portion to which an applied, stress is equal to or greater than about 0.6 times of and equal to or less than about 0.8 times of a stress applied to the center portion of the display panel.

10. The display device of claim 1, further comprising:
a light guide member that receives light from the light source and that is disposed between the display panel and the bottom chassis; and
a reflection member disposed between the light guide member and the bottom chassis that reflects light incident to the reflection member back to the light guide member.

11. A display device, comprising:
a display panel that includes a curved display surface; and
a bottom chassis that supports the display panel,
wherein the bottom chassis comprises:
   a base portion; and
   a fixing surface facing the display panel and curved to have a shape that corresponds to a graph of a sine function.

12. The display device of claim 11, wherein the bottom chassis further comprises:
main beading portions that protrude outward from one surface of the base portion by a first length; and
sub-beading portions that protrude outward from the one surface of the base portion by a second length that differs from the first length.

13. The display device of claim 12, wherein the first length is longer than the second length.

14. The display device of claim 13,
wherein the main beading portions comprise:
   a plurality of first main beading portions that extend in a first direction and are spaced apart in a second direction that crosses the first direction;
   a second main beading portion that extends between first ends of the first main beading portions and that extends in the second direction; and
   a third main beading portion that extends between second ends of the first main heading portions and that extends in the second direction, and
the sub-beading portions comprise:
   a first sub-beading portion that crosses a center portion of each of the first main beading portions and that extends in the second direction;
   a second sub-beading portion that is between the first sub-beading portion and the second main beading portion, that crosses a portion of each of the first main beading portions, and that extends in the second direction; and
   a third sub-beading portion that is between the first sub-beading portion and the third main beading portion, that crosses another portion of each of the first main beading portions, and that extends in the second direction.

15. The display device of claim 14, wherein a first distance in the first direction between the second sub-beading portion and the first sub-beading portion is shorter than a second distance in the first direction between the second sub-beading portion and a corner of the base portion that is nearest to the second sub-beading portion.

16. The display device of claim 15, wherein the first distance is about 0.65 times to about 0.8 times of the second distance.

17. The display device of claim 14, wherein
the first sub-heading portion is disposed corresponding to a center portion of the display panel, and
each of the second sub-beading portion and the third sub-beading portion is disposed corresponding to a portion to which an applied stress is equal to or greater than about 0.6 times of and equal to or smaller than about 0.8 times of a stress applied to the center portion of the display panel.

18. The display device of claim 17, wherein the second sub-heading portion and the third sub-beading portion are symmetrically disposed with respect to the first sub-beading portion.

19. The display device of claim 12, wherein each of the main beading portions comprises a groove formed therein and having a predetermined depth.

* * * * *